United States Patent
Youngs et al.

(10) Patent No.: US 9,971,459 B2
(45) Date of Patent: May 15, 2018

(54) TOUCH SENSITIVE MODULE WITH INTEGRATED SENSOR AND ARTWORK

(71) Applicant: Apple Inc., Cupertino, CA (US)

(72) Inventors: Lynn R. Youngs, Cupertino, CA (US); Sunggu Kang, San Jose, CA (US); James Edward Alexander Pedder, Cupertino, CA (US); Hao Zhang, Cupertino, CA (US); John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 14/169,287

(22) Filed: Jan. 31, 2014

(65) Prior Publication Data

US 2015/0220183 A1 Aug. 6, 2015

(51) Int. Cl.
*G06F 3/044* (2006.01)

(52) U.S. Cl.
CPC .... *G06F 3/044* (2013.01); *G06F 2203/04103* (2013.01)

(58) Field of Classification Search
CPC .......................... G06F 3/044; G06F 2203/04103
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,297,811 B1 * | 10/2001 | Kent et al. | 345/173 |
| 6,310,610 B1 | 10/2001 | Beaton et al. | |
| 6,323,846 B1 | 11/2001 | Westerman et al. | |

(Continued)

FOREIGN PATENT DOCUMENTS

| | | |
|---|---|---|
| JP | 2000-163031 A | 6/2000 |
| JP | 2002-342033 A | 11/2002 |
| JP | 2009169159 A * | 7/2009 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Patrick F Marinelli
(74) *Attorney, Agent, or Firm* — Morrison & Foerster LLP (57) ABSTRACT

A touch sensor panel including artwork formed on the touch sensor panel is disclosed. The touch sensor panel stackup can include a substrate, one or more underlying layers, one or more patterned transparent conductive layers, a passivation layer, artwork, and an adhesive layer. The artwork on the touch sensor panel can be formed by aligning to the touch sensor pattern or alignment marks. In some examples, the artwork can be formed on a discrete touch sensor panel, and the discrete touch sensor panel can be bonded to a cover glass or cover material. In some examples, the touch sensor panel can be a Dual-sided Indium Tin Oxide (DITO) stackup. In some examples, the drive lines and the sense lines of the touch sensor panel can be formed on separate substrates, and the substrates can be bonded together using an adhesive.

16 Claims, 11 Drawing Sheets

(56) References Cited

U.S. PATENT DOCUMENTS

| | | |
|---|---|---|
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,294,677 B2* | 10/2012 | Wu et al. ............ 345/173 |
| 8,479,122 B2 | 7/2013 | Hotelling et al. |
| 8,847,906 B2* | 9/2014 | Ho ............ G06F 3/044 345/173 |
| 2006/0197753 A1 | 9/2006 | Hotelling |
| 2009/0102808 A1* | 4/2009 | Huang et al. ............ 345/173 |
| 2009/0160817 A1* | 6/2009 | Wu et al. ............ 345/173 |
| 2010/0164881 A1* | 7/2010 | Kuo et al. ............ 345/173 |
| 2011/0005662 A1* | 1/2011 | Sung ............ 156/153 |
| 2011/0199332 A1* | 8/2011 | Hung et al. ............ 345/174 |
| 2011/0205180 A1* | 8/2011 | Han et al. ............ 345/174 |
| 2011/0254802 A1* | 10/2011 | Philipp ............ 345/174 |
| 2011/0256307 A1* | 10/2011 | Kim et al. ............ 427/79 |
| 2012/0038595 A1* | 2/2012 | Park et al. ............ 345/174 |
| 2012/0229417 A1* | 9/2012 | Badaye ............ 345/174 |
| 2012/0247937 A1* | 10/2012 | Saito et al. ............ 200/512 |
| 2013/0100039 A1* | 4/2013 | Hong et al. ............ 345/173 |
| 2013/0135241 A1 | 5/2013 | Wu et al. |
| 2013/0154949 A1 | 6/2013 | Roudbari et al. |
| 2013/0168220 A1* | 7/2013 | Ho ............ G06F 3/044 200/600 |
| 2013/0271408 A1* | 10/2013 | Xie et al. ............ 345/173 |
| 2014/0078111 A1* | 3/2014 | Lee et al. ............ 345/176 |
| 2014/0176826 A1* | 6/2014 | Kim et al. ............ 349/12 |
| 2014/0247226 A1* | 9/2014 | Chiu ............ G06F 3/041 345/173 |
| 2014/0353009 A1* | 12/2014 | Zhao ............ H05K 3/361 174/253 |
| 2015/0220183 A1* | 8/2015 | Youngs ............ G06F 3/044 345/173 |
| 2016/0132157 A1* | 5/2016 | Lee ............ G06F 3/044 345/174 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

TOUCH SENSITIVE MODULE WITH INTEGRATED SENSOR AND ARTWORK

FIELD

This relates generally to touch sensor devices, and in particular, to touch sensor panels with integrated sensor and artwork.

BACKGROUND

Many types of input devices are presently available for performing operations in a computing system, such as buttons or keys, mice, trackballs, touch sensor panels, joysticks, touch screens, and the like. Touch sensitive devices, in particular, have become popular as input devices to computing systems due to their ease and versatility of operation as well as their declining price. Touch sensitive devices can include a touch sensor panel, which can be a clear panel with a touch sensitive surface. The touch sensor panel can be positioned in front of a display screen so that the touch-sensitive surface covers the viewable area of the display screen, and a cover glass or cover material can be positioned in front of the touch sensor panel for protection. The touch sensitive device can allow a user to perform various functions by touching the cover glass or cover material using a finger, stylus or other object. In general, the touch sensitive device can recognize a touch event and the position of the touch event on the touch sensor panel. A computing system can interpret the touch event, in accordance with the display screen appearing at the time of the touch event, and thereafter can perform one or more actions based on the touch event.

Touch sensor panels can be implemented as an array of pixels formed discretely on a transparent substrate, where multiple drive lines (e.g. rows) cross over and are separated from multiple sense lines (e.g. columns) separated by a dielectric material and/or one or more transparent substrates. Alternatively, to achieve thinner touch sensitive devices, the drive and/or sense lines can be formed on the back of a cover glass or cover material. The drive lines and sense lines can be routed to a flex circuit in border areas of the touch sensor panel, and artwork can be disposed on the cover glass or cover material in the border areas to prevent the routing traces from being seen by the user. However, disposing the artwork on the cover glass or cover material can lead to poor registration accuracy due to the alignment of the artwork to the cover glass or cover material edge, long manufacturing times due to the slow, piece-to-piece process, and possible degradation of layers in the touch sensor panel stackup.

SUMMARY

This relates to a touch sensor panel including artwork formed on the touch sensor panel. By forming the artwork on the touch sensor panel and aligning to the touch sensor pattern or alignment marks, the registration accuracy and the quality of the layers in the touch sensor panel stackup can be improved, and the manufacturing times can be decreased. In some examples, the artwork can be formed on a discrete touch sensor panel, and the discrete touch sensor panel can be bonded to a cover glass or cover material. In some examples, the touch sensor panel can be a Dual-sided Indium Tin Oxide (DITO) stackup. In some examples, the drive lines and the sense lines of the touch sensor panel can be formed on separate substrates, and the substrates can be bonded together using an adhesive.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

Although some examples of the disclosure are described herein in terms of mutual capacitance multi-touch sensor panels, it should be understood that examples of the disclosure are not so limited, but can be additionally applicable to self-capacitance sensor panels and single-touch sensor panels. Furthermore, although the touch sensors in the touch sensor panel may be described herein in terms of an orthogonal array of touch sensors having rows and columns, examples of the disclosure are not limited to orthogonal arrays, but can be generally applicable to touch sensors arranged in any number of dimensions and orientations, including diagonal, concentric circle, three-dimensional, and random orientations.

Additionally, although some examples of the disclosure may be described herein in terms of substantially transparent touch sensor panels, in other examples the touch sensor panel can be opaque. Although the touch sensors may be described herein as being formed as a co-planar single-layer on a substrate or cover glass, in other examples the touch sensors can be formed from non-coplanar layers on a single substrate or cover glass, and the cover glass can be formed of substrate materials other than glass, such as plastic, for example. In some examples, the touch sensors are formed using thin-film processing techniques, but other processing techniques can also be used.

Figure 1:
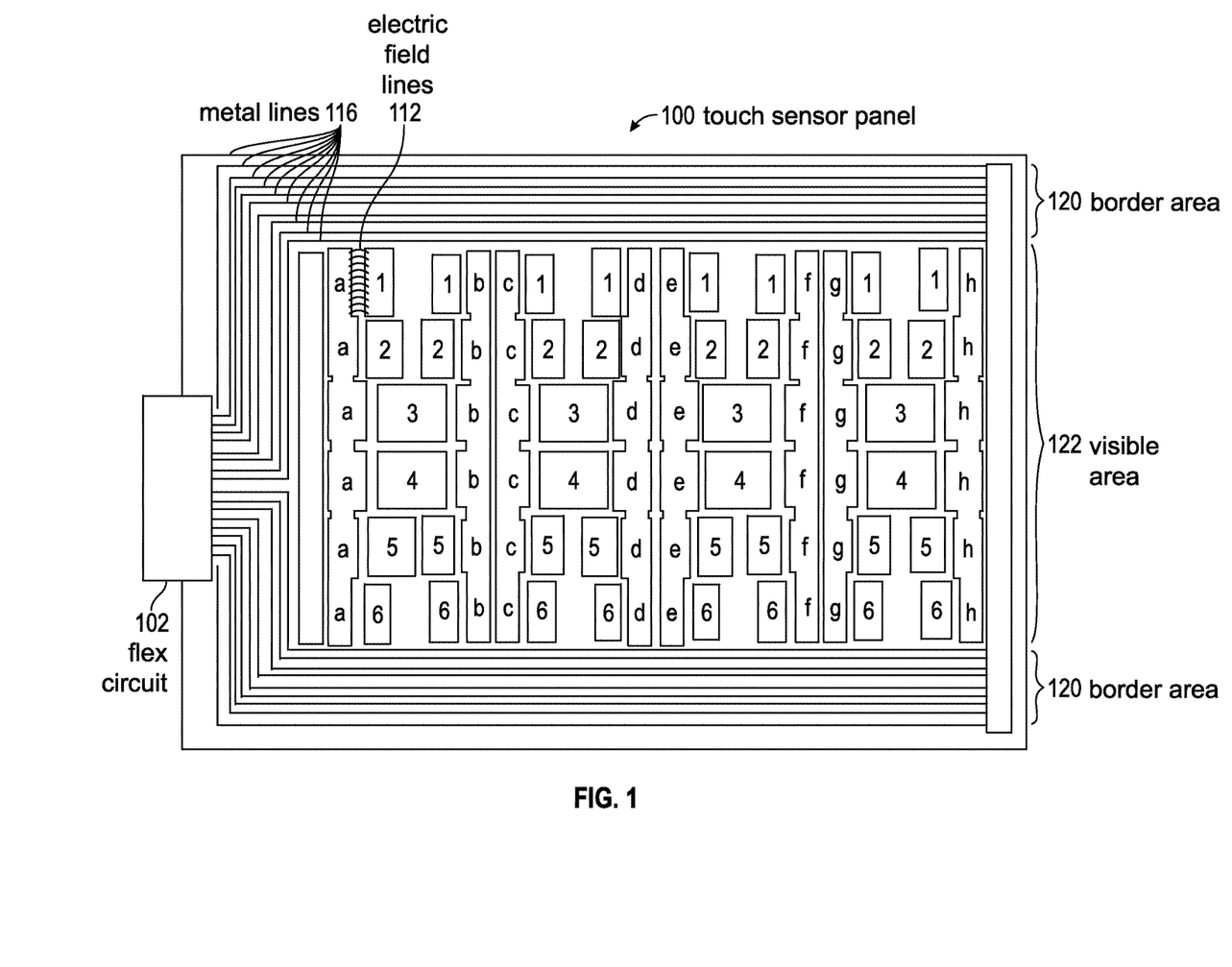
FIG. 1 illustrates a partial view of an exemplary substantially transparent touch sensor panel having co-planar single-layer touch sensors fabricated on a single side of a substrate according to examples of the disclosure.

FIG. 1 illustrates a partial view of an exemplary substantially transparent touch sensor panel 100 having co-planar single-layer touch sensors fabricated on a single side of a substrate according to examples of the disclosure. In the example of FIG. 1, a touch sensor panel 100 having eight columns (labeled a through h and six rows (labeled 1 through 6) is shown, although it should be understood that any number of columns and rows can be employed. Columns a through h can generally be columnar in shape, although in the example of FIG. 1, one side of each column includes staggered edges and notches designed to create separate sections in each column. Each of rows 1-6 can be formed from a plurality of distinct patches or pads in the visible area 122, each patch including a trace of the same material as the patch and routed using metal lines 116 to the border area 120 of the touch sensor panel 100 for enabling all patches in a particular row to be connected through metal traces or routing traces 96 running in the border areas 120. These routing traces 106 can be routed to a small area on one side of the touch sensor panel 100 and connected to a flex circuit 102. In FIG. 1, for example, the patches for rows 1-3 between columns a and b are arranged in an inverted pyramid configuration, while the patches for rows 4-6 between columns a and b are arranged in an upright pyramid configuration.

The column and rows of FIG. 1 can be formed in a co-planar single layer of conductive material. In some examples, the conductive material can be a substantially transparent material, such as Indium Tin Oxide (ITO), although other materials can be used. The ITO layer can be formed either on the back of a cover glass or on the top of a separate substrate. Although ITO may be referred to herein for purposes of simplifying the disclosure, it should be understood that other conductive materials can also be used according to examples of the disclosure.

If touch sensor panel 100 is operated as a mutual capacitance touch sensor panel, either the columns a-h or the rows 1-6 can be driven with one or more stimulation signals, and fringing electric fields can form between adjacent column areas and row patches. In FIG. 1, it should be understood that although only electric field lines 112 between column a and row patch 1 (a-1) are shown for purposes of illustration, electric field lines can be formed between other adjacent column and row patches (e.g. a-2, b-4, g-5, etc.) depending on what columns or rows are being stimulated. Thus, it should be understood that each column-row patch pair (e.g. a-1, a-2, b-4, g-5, etc.) can represent a two-electrode pixel or sensor at which charge can be coupled onto the sense electrode from the drive electrode. When a finger or object touches down over one of these pixels, some of the fringing electric field lines that extend beyond the cover of the touch sensor panel are blocked by the finger, reducing the amount of charge coupled onto the sense electrode. This reduction in the amount of coupled charge can be detected as part of determining a resultant "image" of touch. It should be noted that in mutual capacitance touch sensor panel designs as shown in FIG. 1, no separate reference ground is needed, so no second layer on the back side of the substrate or on a separate substrate is needed.

In some examples, the touch sensor panel 100 can be operated as a self-capacitance touch sensor panel. A reference ground plane can optionally be formed on the back side of the substrate or on a separate substrate. In a self-capacitance touch sensor panel, each pixel or sensor has a self-capacitance to a reference ground that can be changed due to the presence of a finger. In self-capacitance examples, the self-capacitance of columns a-h can be sensed independently, and the self-capacitance of rows 1-6 can also be sensed independently.

Figure 2:
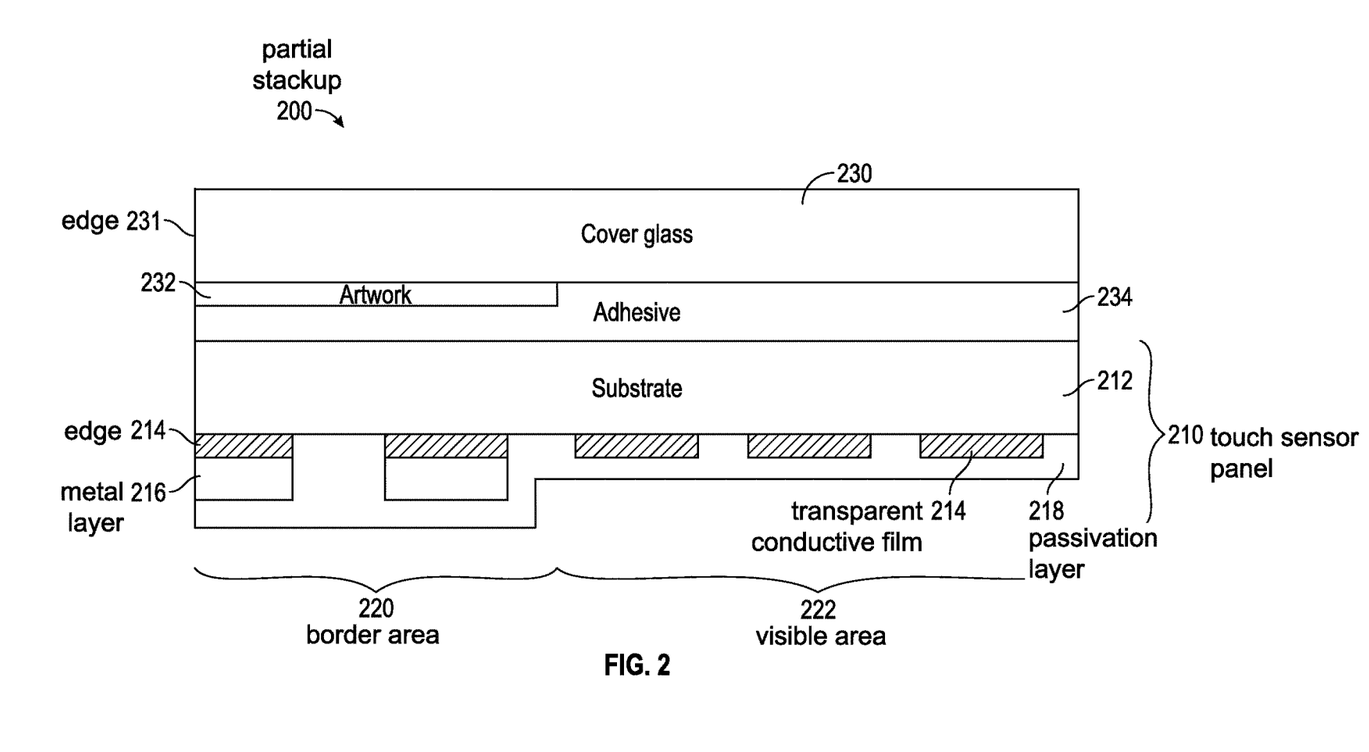
FIG. 2 illustrates an exemplary cross-sectional view of a partial stackup of a touch sensor panel formed discretely and bonded to a cover glass or cover material according to examples of the disclosure.
Figure 3:
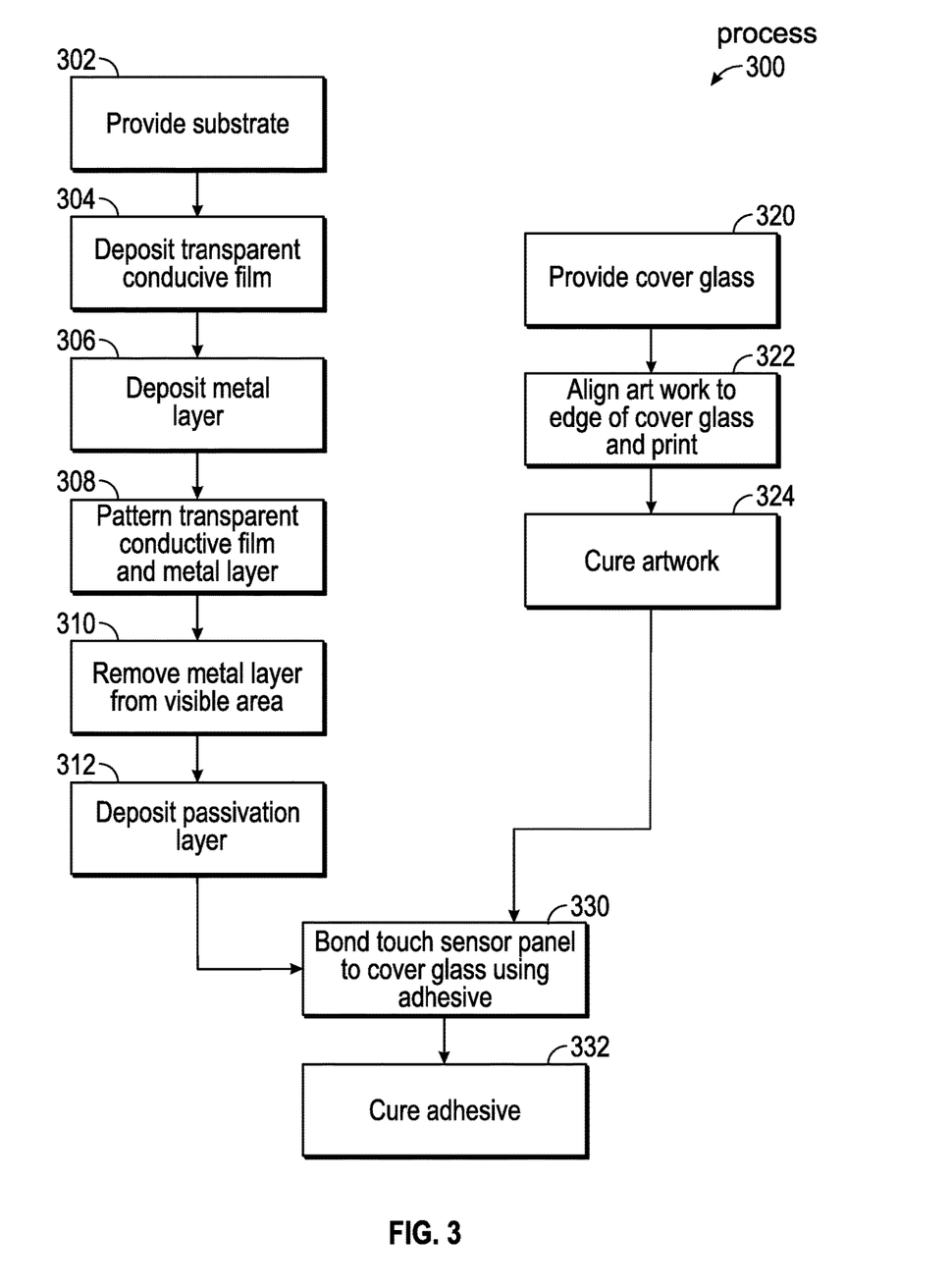
FIG. 3 illustrates an exemplary process for manufacturing a touch sensitive device according to examples of the disclosure.

FIG. 2 illustrates exemplary cross-sectional view of a partial stackup 200 of a touch sensor panel formed discretely and bonded to a cover glass according to examples of the disclosure. FIG. 3 illustrates an exemplary process 300 for manufacturing the touch sensitive device according to examples of the disclosure. The stackup can include a touch sensor panel 210 formed on a substrate 212. At step 302, substrate 212 made of any substrate material, such as plastic, glass or quartz, can be provided. At step 304, a layer of transparent conductive film (TCF) 214 can be deposited on the substrate 212. Example TCF materials can include, but are not limited to, Indium Tin Oxide (ITO), Aluminum Zinc Oxide (ACO), Indium Zinc Oxide (IZO), Zinc-doped Indium-Tin-Oxide (ITZO), Silver nanowires (AgNW), Silver Chloride (AgCl), Graphene and Carbon nanotubes (CNT). Any number of deposition techniques can be employed including chemical vapor deposition, such as plasma-enhanced chemical vapor deposition (PECVD), physical vapor deposition (PVD), such as sputtering or evaporation, or wet deposition, such as blade, spray, or aerosol deposition. At step 306, metal layer 216 can be deposited using any number of techniques, including blanket deposition, screen printing, and inkjet printing. At step 308, TCF layer 214 and/or metal layer 216 can be patterned by methods, such as photolithography and etching or laser patterning, to form the touch sensors in the visible area 222 of the touch sensor panel and routing traces in the border area 220. At step 310, the metal layer 216 in the visible area 222 can be removed. At step 312, a passivation layer 218 can, optionally, be applied to the patterned sensor for protection. The passivation layer 218 can be deposited using wet processing techniques, such as blade, spray, or inkjet printing, or roll-coated using a die-cut film. In some examples, the passivation layer 218 may be photoimageable, in which case an expose and development step may be required. The touch sensitive device 200 can also include a cover glass 230 that can be provided, in step 320, as part of a housing. Cover glass 230 can be transparent, scratch-resistant, and chemically strengthened using any number of techniques, such as a glass ion exchange bath. At step 322, artwork 232, which can be formed of opaque material such as a color-decoration or a black mask, can be formed on the cover glass 230 to hide routing traces from being visible to the user. The artwork 232 can be formed by aligning to the edge 231 of the cover glass 230 and screen printed using an ink suitable for the artwork 232. The thickness and colors of the artwork 232 can vary depending on the aesthetic requirements. At step 324, the artwork 232 can be thermally cured. At step 330, the touch sensor panel 210 can be bonded to cover glass 230 and artwork 232 using an adhesive 234, such as a pressure sensitive adhesive (PSA) or an optically clear adhesive (OCA). At step 332, the adhesive 234 can be cured using either a thermal source or a UV source. In some examples, the touch sensor panel 210 can be rolled on or pressed on, followed by an autoclave process to eliminate any unwanted bubbles. In some examples, one or more underlying layers, such as an index matching layer or a hard coating layer, can be deposited between the TCF layer and the substrate or on top of the TCF layer.

Figure 4:
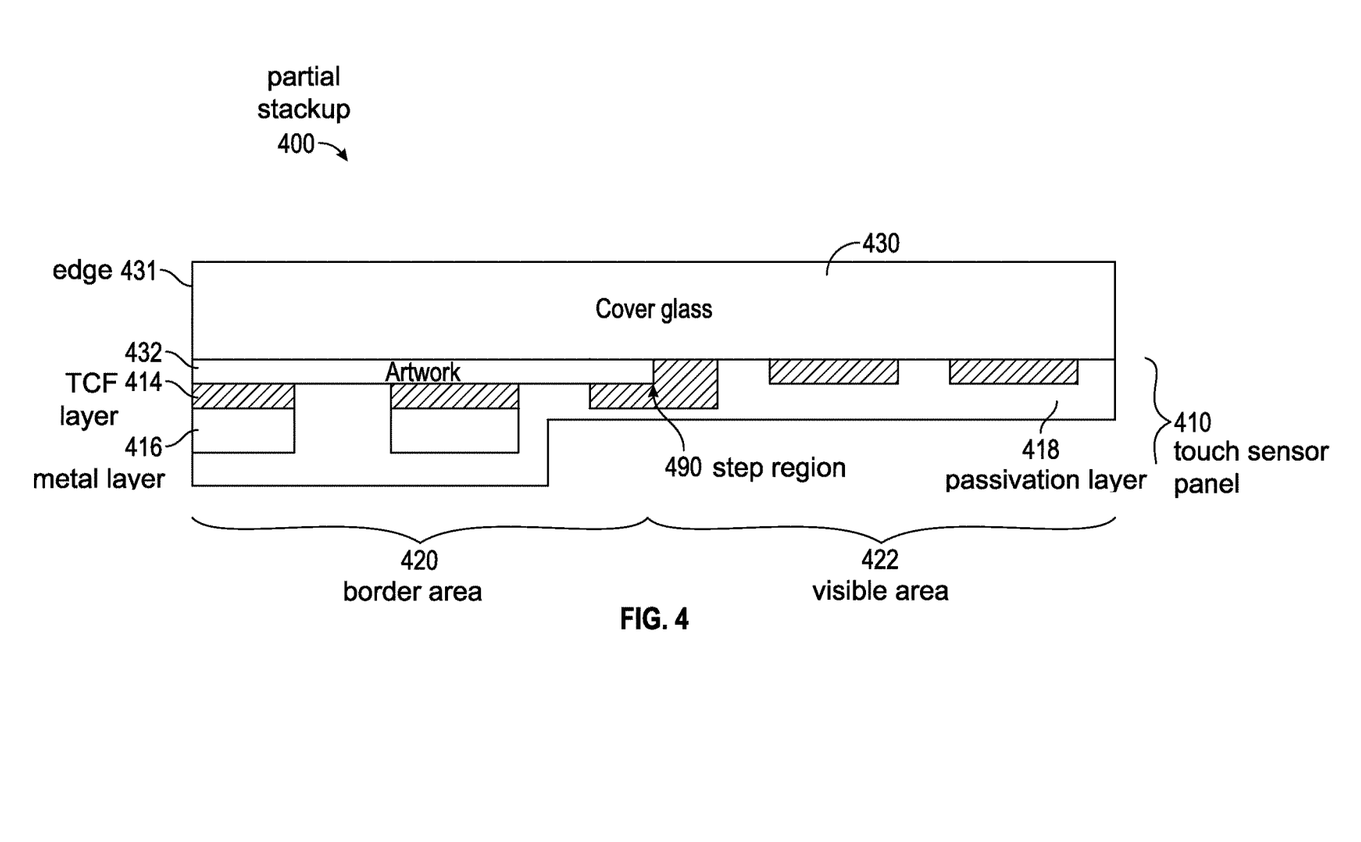
FIG. 4 illustrates an exemplary cross-sectional view of a partial stackup of a touch sensor panel formed on the back of a cover glass or cover material according to examples of the disclosure.
Figure 5:
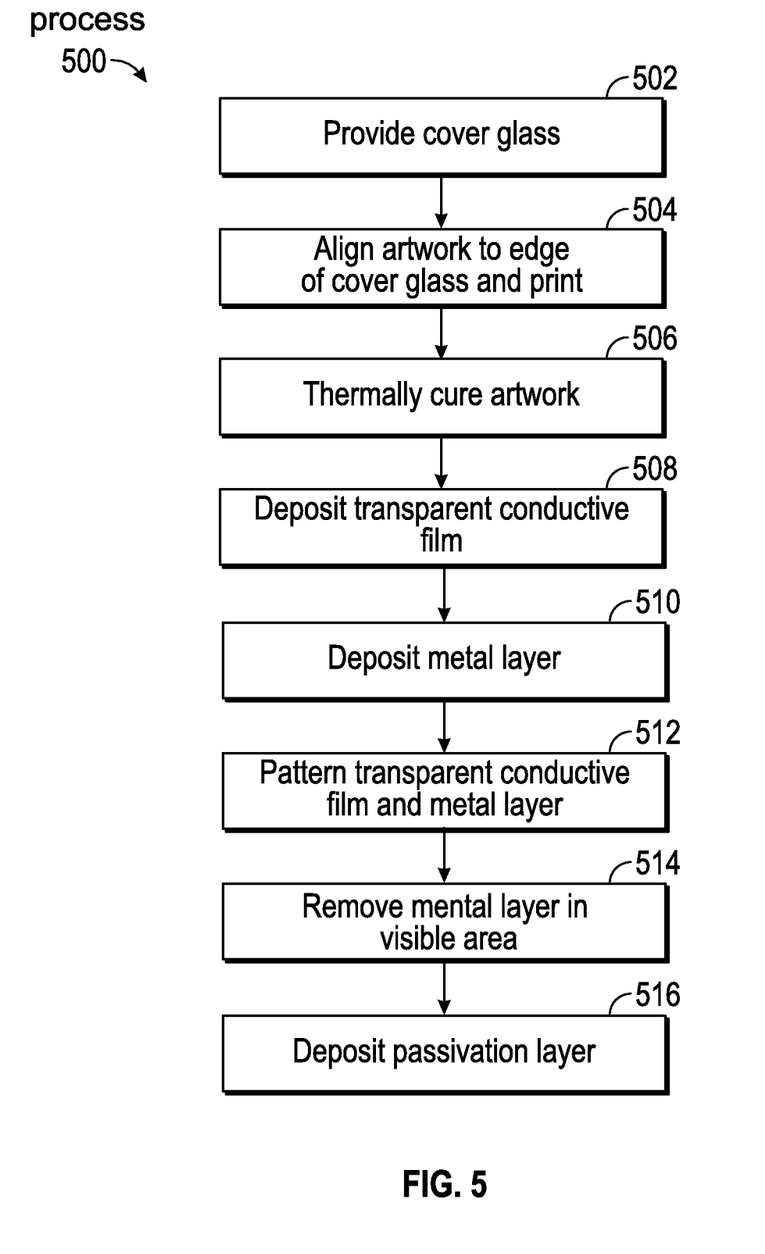
FIG. 5 illustrates an exemplary process for manufacturing the touch sensitive device according to examples of the disclosure.

To reduce the number of layers in the stackup, thereby producing a thinner touch sensitive device, the touch sensor panel can be formed on the back of the cover glass. FIG. 4 illustrates an exemplary cross-sectional view of a partial stackup 400 of a touch sensor panel 410 formed on the back of a cover glass (BOC) according to examples of the disclosure. FIG. 5 illustrates an exemplary process 500 for manufacturing the touch sensitive device according to examples of the disclosure. At step 502, a cover glass 430 can be provided. The cover glass 430 can be transparent, scratch-resistant, and chemically strengthened using any number of techniques, such as a glass ion exchange bath. At step 504, artwork 432 can be formed by aligning to the edge 431 of the cover glass 430 and screen printed using an ink suitable for the artwork 432. The thickness and colors of the artwork 432 can vary depending on the aesthetic requirements. Artwork 432 can be inorganic or organic, provided that the artwork is a good insulator to avoid shorting the metal lines and can block light from passing through. At step 506, the artwork 432 can be thermally cured. At step 508, TCF layer 414 can be deposited by any number of deposition techniques, such as chemical vapor deposition, physical vapor deposition, wet deposition, or aerosol deposition. At step 510, metal layer 416 can be deposited by either blanket deposition, screen printing, inkjet printing, or the like. At step 512, TCF layer 414 and/or metal layer 416 can patterned by photolithography and etching or laser patterning, to form the touch sensors in the visible area 422 and routing traces in the border area 420. At step 514, the metal layer 416 in the visible area 422 can be removed. At step 516, a passivation layer 418 can, optionally, be deposited on the patterned sensor to protect the TCF and metal layers from corrosion. Techniques for deposition of the passivation layer can include blade, spray, or inkjet printing; alternatively, the passivation layer can be roll-coated using a die cut film.

While the BOC stackup, as exemplified in FIG. 4, can be formed with fewer number of layers and processing steps compared to the discrete sensor stackup as exemplified in FIG. 2, both processes can still be time consuming, requiring a piece-to-piece process with curing steps in between deposition or printing steps. Additionally, alignment of the artwork can be based on the edge of the cover glass, which can lead to poor registration accuracy. Furthermore, the quality of one or more layers in either stackup can be compromised. To achieve a high quality TCF layer, a high deposition temperature may be required. However for the BOC process, the high temperature deposition process can lead to degradation to the underlying artwork or can limit the number of compatible artwork inks. Additionally, the chemicals used for patterning the TCF layer and/or metal layer can be strongly acid or alkali. The chemicals can damage the artwork and/or cover glass and can limit the number of compatible artwork inks. If the TCF layer and/or metal layer is patterned using laser ablation, the artwork and/or cover glass can undergo damage from the laser. Moreover for the BOC process, the artwork step region can lead to a break in the TCF continuity at the location of the step region 490, as shown in FIG. 4.

Figure 6:
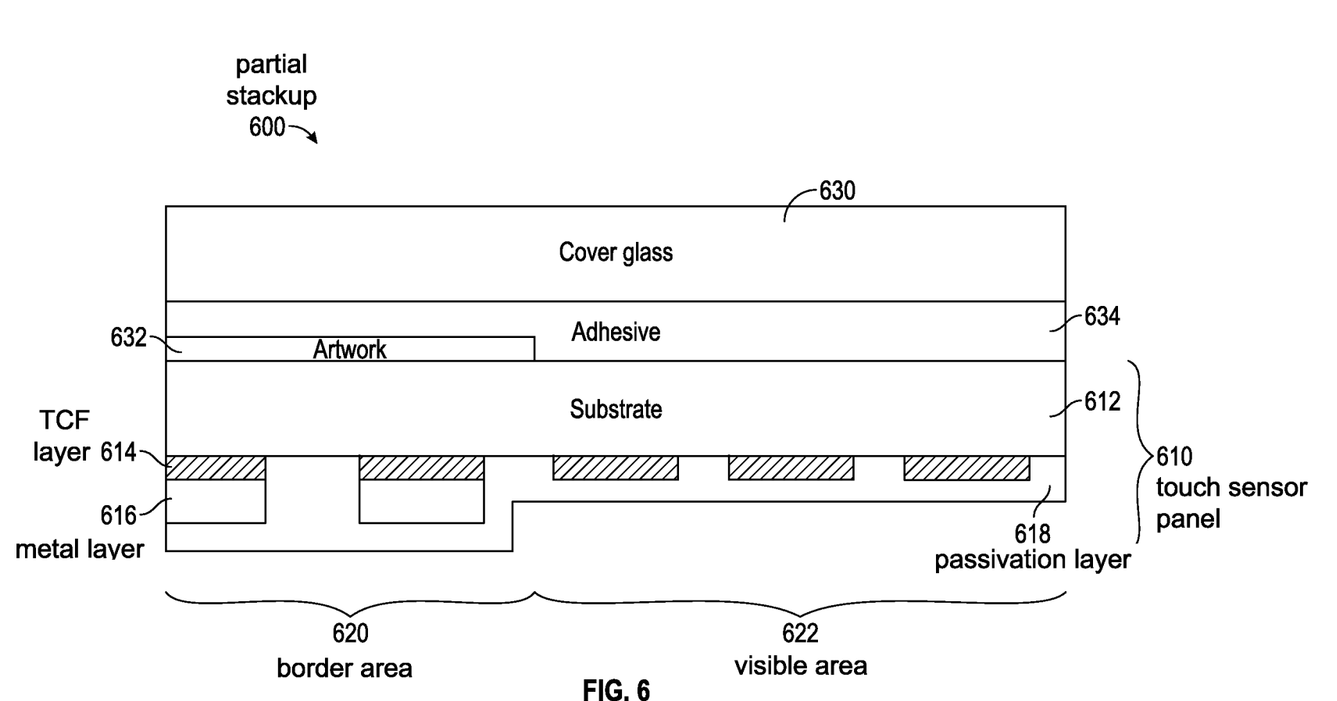
FIG. 6 illustrates an exemplary cross-sectional view of a partial stackup of a touch sensitive device with artwork formed on the touch sensor panel according to examples of the disclosure.
Figure 7:
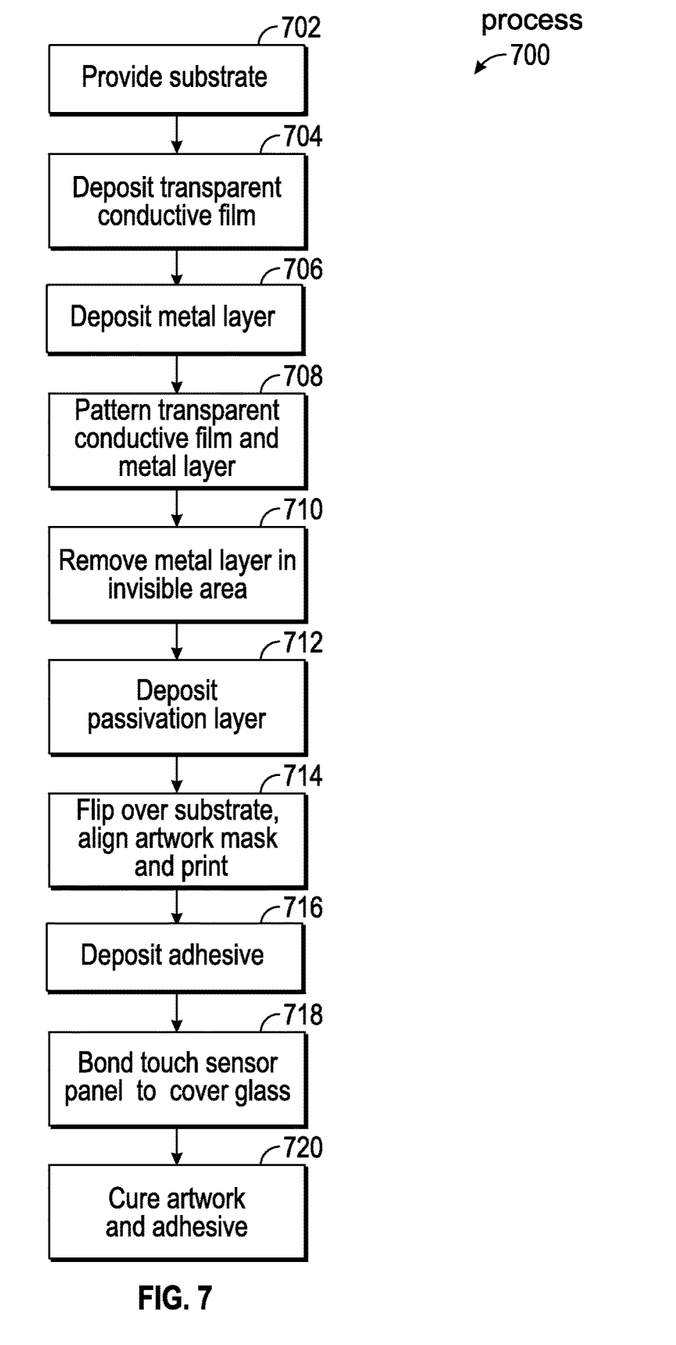
FIG. 7 illustrates an exemplary process for manufacturing the touch sensitive device according to examples of the disclosure.

FIG. 6 illustrates an exemplary cross-sectional view of a partial stackup of a touch sensitive device with artwork formed on the touch sensor panel according to examples of the disclosure. FIG. 7 illustrates an exemplary process 700 for manufacturing the touch sensitive device according to examples of the disclosure. At step 702, substrate 612 made of any substrate material, such as plastic, glass or quartz, can be provided. At steps 704 and 706, a TCF layer 614 can be deposited on substrate 612, and metal layer 616 can be deposited on TCF layer 614. At step 708, the TCF layer 614 and/or metal layer 616 can be patterned to form the touch sensors in the visible area 622 and routing traces in the border area 620. At step 710, the metal layer 616 in the visible area 622 can be removed. At step 712, a passivation layer 618 can, optionally, be deposited on the TCF layer 614 and metal layer 616. At step 714, substrate 612 can be flipped over, artwork 632 can be aligned, and then artwork 632 can be printed. At step 716, an adhesive 634 can be deposited or printed. At step 718, a cover glass 630 can be bonded or laminated to the touch sensor panel 610. At step 720, the artwork 632 and adhesive 634 can be cured using either a thermal source or a UV source.

By forming the artwork on the touch sensor panel instead of on the back of the cover glass, the quality of some of the layers in the stackup of the touch sensitive device can be retained without compromising the quality of the other layers. High temperature deposition of the TCF layer for high quality drive and sense lines can be performed without compromising the quality of the artwork, since the artwork can be formed after the touch sensors are deposited and patterned. The high temperature depositions can allow for a wider range of TCF materials, such as higher conductivity transparent conductive oxides. Damage to the artwork and/or cover glass from the chemicals or the laser source during the patterning of the TCF layers and/or metal layers can be avoided. Additionally, a wider range of artwork inks and TCF materials can be used in the stackup. Due to the elimination or reduction of the step coverage issue, thicker artwork inks can be used, and metallic/conductive inks can be more easily tolerated. Moreover, forming the artwork on the touch sensor panel instead of on the back of the cover glass can allow for a more accurate alignment of the artwork. The artwork can be aligned to the touch sensor pattern or alignment marks located on one or more layers of the stackup, which can improve the quality of the edges of the artwork. The more accurate alignment can also lead to less required overlap or thinner artwork to hide the routing traces, resulting in a larger visible area.

The stackup of FIG. 6 can be fabricated with minimal changes in the manufacturing process. Printing of the artwork on the touch sensor panel can be achieved using similar processing lines for photolithography. In some examples, the entire or most of the layers in the stackup can be fabricated in one manufacturing line using a roll-to-roll or sheet-to-sheet process. Fabrication in one manufacturing line can lead to higher productivity and faster manufacturing times. Additionally, printing of the artwork on the touch sensor panel can be compatible with mother sheet processing of the cover glass. The mother sheet can be singulated or cut into separate sheets after the touch sensor panels are laminated or bonded to the cover glass.

Figure 8A:
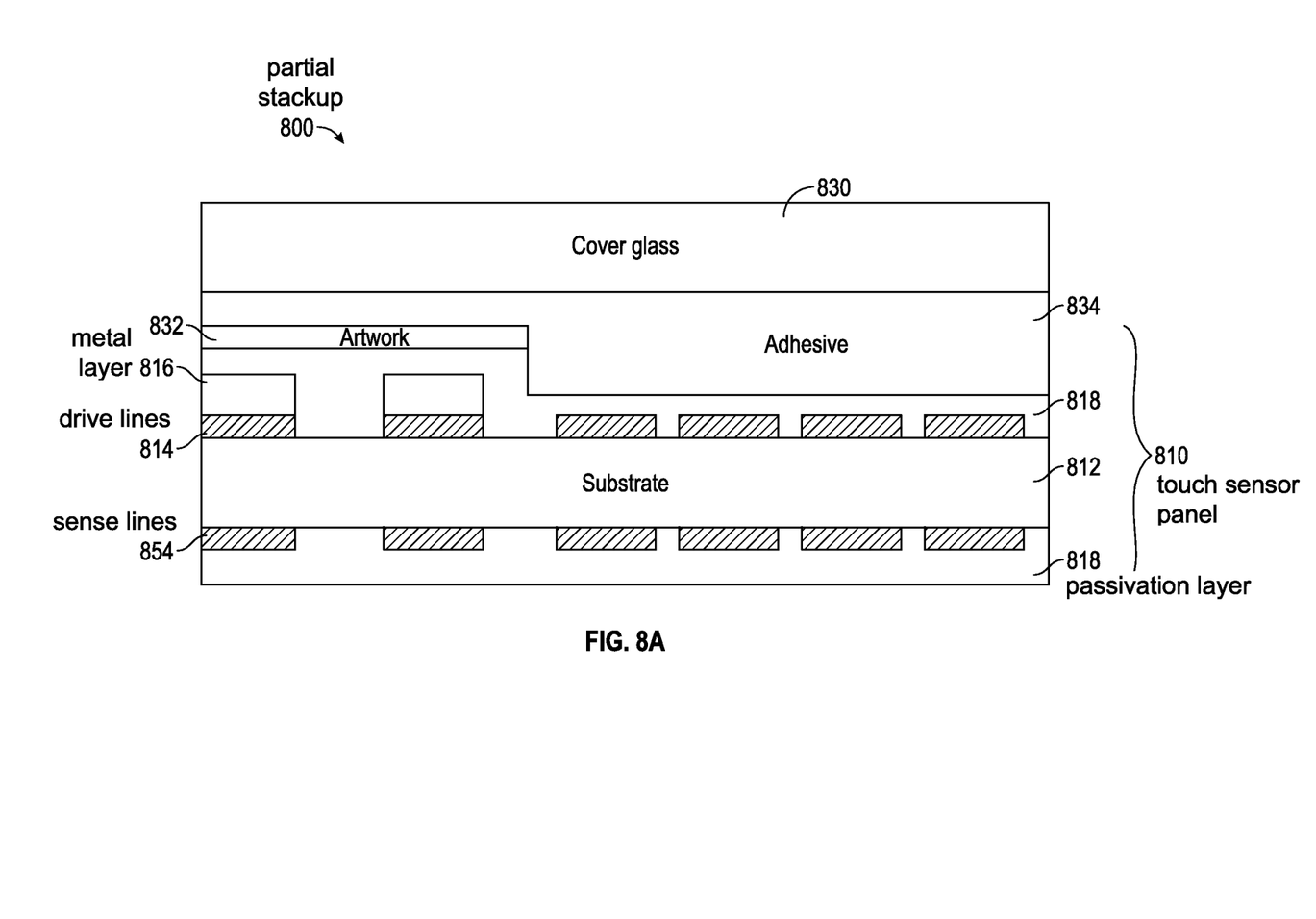
FIGS. 8A-8B illustrate an exemplary cross-sectional view of a partial stackup of a touch sensitive device with artwork formed on a touch sensor panel according to examples of the disclosure.
Figure 8B:
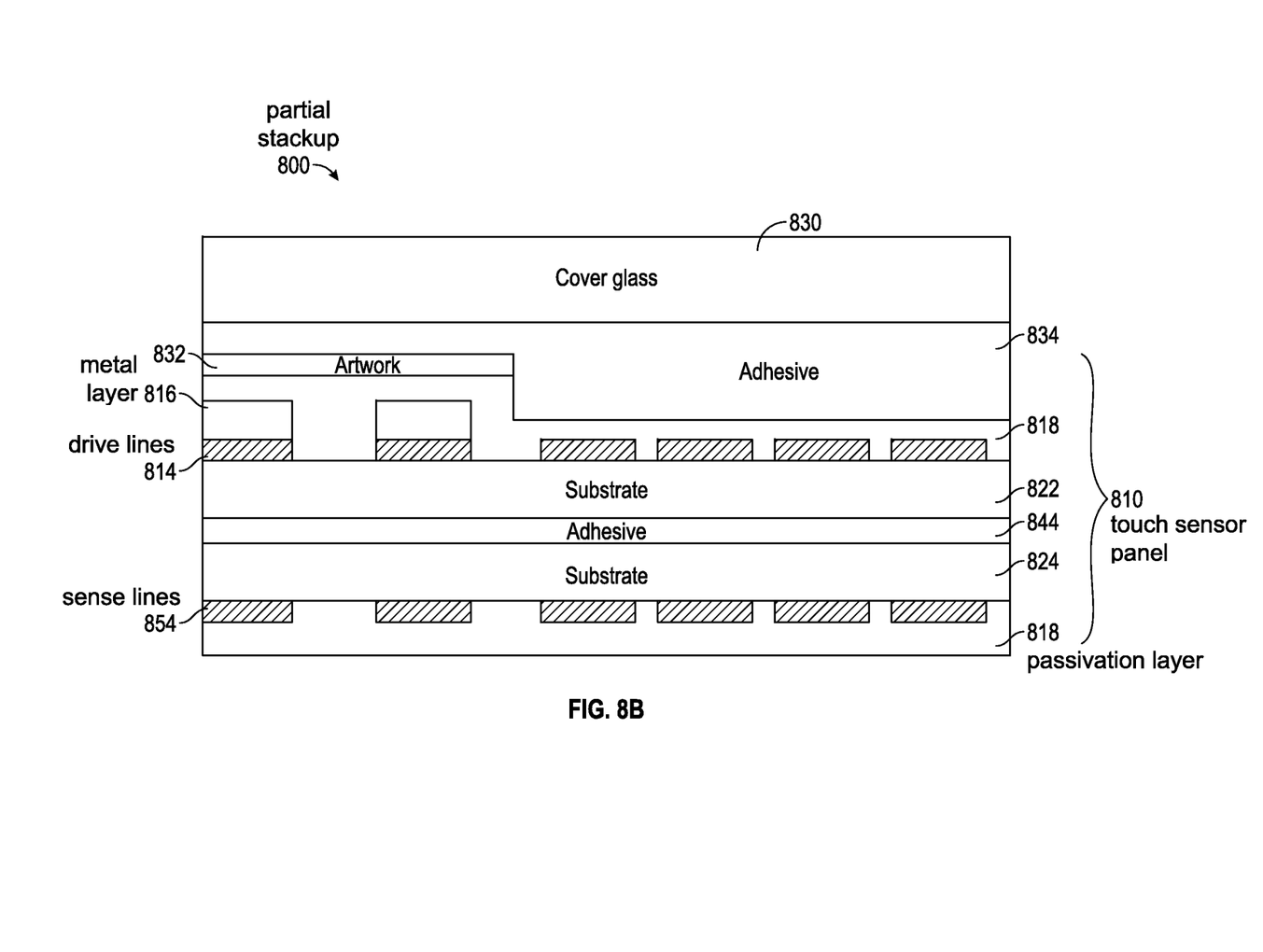

FIGS. 8A-8B illustrate an exemplary cross-sectional view of a partial stackup 800 of a touch sensitive device with artwork formed on a touch sensor panel according to examples of the disclosure. The DITO stackup can be formed with drive lines 814 and metal layer 816 deposited on one side of the substrate to form the routing traces for the drives lines. Sense lines 854 and a metal layer (not shown) can be deposited on the other side of the substrate to form the sense lines and routing traces for the sense lines. Passivation layers 818 can optionally be deposited on one or both sides. Artwork 832 can be formed on the touch sensor. In some examples, the artwork 832 can be in direct contact with the metal layer 816 and/or drive lines 814. An adhesive 834 can be deposited to bond the cover glass 830 to the touch sensor panel. FIG. 8B illustrates a partial stackup with drive lines 814 formed on one substrate 822 and sense lines 854 formed on a second substrate 824. The two substrates 822 and 824 are bonded together using an adhesive 840. In some examples, the deposition and patterning of the layers on substrate 822 can occur at the same time as the deposition and patterning of the layers on substrate 824. While FIGS. 8A-8B illustrate drive lines 814 disposed closer to the cover glass than the sense lines 812, examples of the disclosure include stackups with sense lines disposed closer to the cover glass than the drive lines. Passivation layer 818 can be deposited. Artwork 832 can be aligned to the touch sensor pattern or alignment marks located on one or more layers of the stackup. Substrates 822 and 824 can be bonded together using adhesive 844. Adhesive 834 can be deposited and cover glass 830 can be bonded to the touch sensor panel 810.

Figure 9:
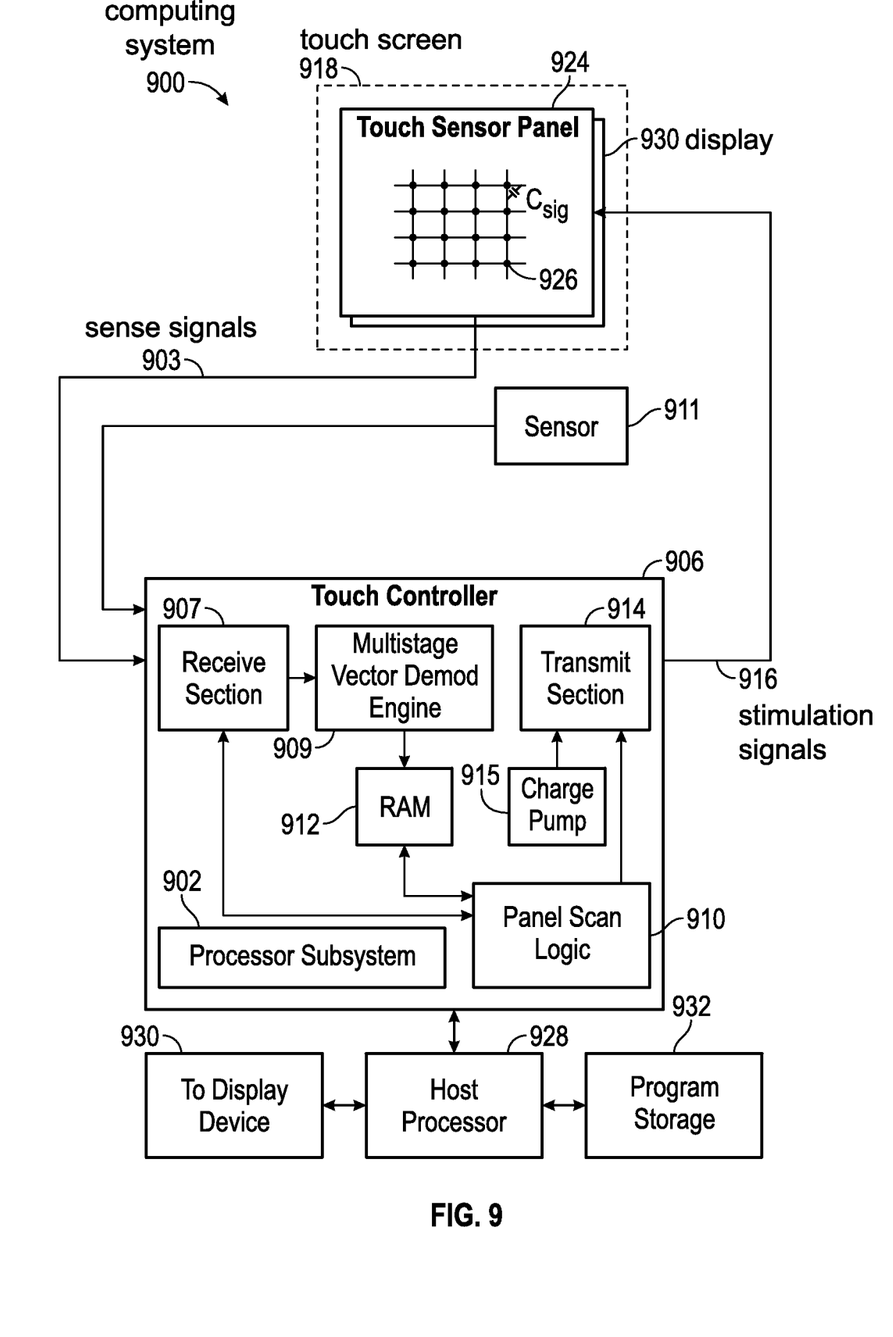
FIG. 9 illustrates an exemplary computing system that can utilize a touch controller according to various examples of the disclosure.

FIG. 9 illustrates exemplary computing system 900 that can utilize the stackups discussed above according to various examples of the disclosure. Touch controller 906 can be a single application specific integrated circuit (ASIC) that can include one or more processor subsystems 902, which can include, for example, one or more main processors, such as ARM968 processors or other processors with similar functionality and capabilities. However, in other examples, some of the processor functionality can be implemented instead by dedicated logic, such as a state machine. Processor subsystems 902 can also include, for example, peripherals such as random access memory (RAM) 912 or other types of memory or storage, watchdog timers (not shown), and the like. Touch controller 906 can also include, for example, receive section 907 for receiving signals, such as touch sense signals 903, from the sense lines of touch sensor panel 924, and other signals from other sensors such as sensor 911, etc. Touch controller 906 can also include, for example, a demodulation section such as multistage vector demod engine 909, panel scan logic 910, and a drive system including, for example, transmit section 914. Panel scan logic 910 can access RAM 912, autonomously read data from the sense channels, and provide control for the sense channels. In addition, panel scan logic 910 can control transmit section 914 to generate stimulation signals 916 at various frequencies and phases that can be selectively applied to the drive lines of the touch sensor panel 924.

Charge pump 915 can be used to generate the supply voltage for the transmit section. Stimulation signals 916 (Vstim) can have amplitudes higher than the maximum voltage the ASIC process can tolerate by cascading transistors. Therefore, using charge pump 915, the stimulus voltage can be higher (e.g. 6V) than the voltage level a single transistor can handle (e.g. 3.6 V). Although FIG. 9 shows charge pump 915 separate from transmit section 914, the charge pump can be part of the transmit section.

Touch sensor panel 924 can be formed from the stackups discussed above, and can include a capacitive sensing medium having a plurality of drive lines and a plurality of sense lines. The drive and sense lines can be formed from a transparent conductive medium such as Indium Tin Oxide (ITO) or Antimony Tin Oxide (ATO), although other transparent and non-transparent materials such as copper can also be used. In some examples, the drive and sense lines can be perpendicular to each other, although in other examples other non-Cartesian orientations are possible. For example, in a polar coordinate system, the sensing lines can be concentric circles and the driving lines can be radially extending lines (or vice versa). It should be understood, therefore, that the terms "drive lines" and "sense lines" as used herein are intended to encompass not only orthogonal grids, but the intersecting traces or other geometric configurations having first and second dimensions (e.g. the concentric and radial lines of a polar-coordinate arrangement). The drive and sense lines can be formed on, for example, a single side of a substantially transparent substrate.

At the "intersections" of the traces, where the drive and sense lines can pass adjacent to and above and below (cross) each other (but without making direct electrical contact with each other), the drive and sense lines can essentially form two electrodes (although more than two traces could intersect as well). Each intersection of drive and sense lines can represent a capacitive sensing node and can be viewed as pixel or node 926, which can be particularly useful when touch sensor panel 924 is viewed as capturing an "image" of touch. (In other words, after touch controller 906 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel.) The capacitance between drive and sense electrodes can appear as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig.

Computing system 900 can also include host processor 928 for receiving outputs from processor subsystems 902 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 928 can perform additional functions that may not be related to panel processing, and can be coupled to program storage 932 and display 930, such as an LCD display, for providing a user interface to a user of the device. In some examples, host processor 928 can be a separate component for touch controller 906, as shown. In other examples, host processor 928 can be included as part of touch controller 906. In other examples, the functions of host processor 928 can be performed by processor subsystem 902 and/or distributed among other components of touch controller 906. Display device 930 together with touch sensor panel 924, when located partially or entirely under the touch sensor panel, can form touch screen 918.

Note that one or more of the functions described above can be performed, for example, by firmware stored in memory (e.g. one of the peripherals) and executed by processor subsystem 902, or stored in program storage 932 and executed by host processor 928. The firmware can also be stored and/or transported within any non-transitory computer-readable storage medium (excluding signals) for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport readable medium can include, but is not limited to, an electronic, magnetic, optical, electromagnetic, or infrared wired or wireless propagation medium.

Figures 10A, 10B, 10C:
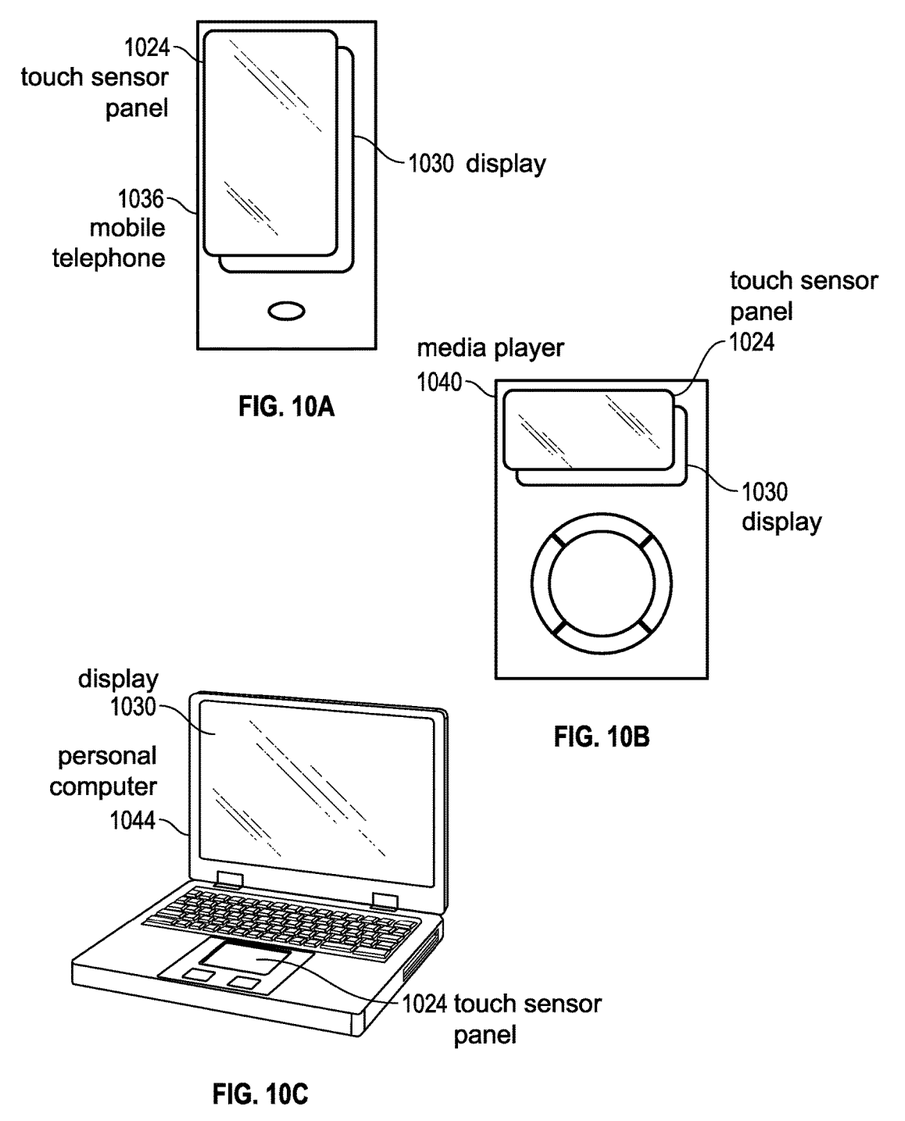
FIGS. 10A-10C illustrate an exemplary mobile telephone, exemplary media player, and exemplary personal computer that can include a touch sensor panel and a display device according to examples of the disclosure.

FIG. 10A illustrates an exemplary mobile telephone 1036 that can include touch sensor panel 1024 and display 1030. FIG. 10B illustrates exemplary media player 1040 that can include touch sensor panel 1024 and display 1030. FIG. 10C illustrates an exemplary personal computer 1044 that can include touch sensor panel (trackpad) 1024 and display 1030. The touch sensor panels 1024 in FIGS. 10A-10C can include one or more touch sensor panels with integrated artwork according to examples of the disclosure. In some examples, the display 1030 can be part of a touch screen.

In some examples, a touch sensor panel is disclosed. The touch sensor panel may comprise: a plurality of first lines of a first conductive material disposed on a first substrate; a second conductive material electrically connected to the plurality of first lines to create one or more traces for off-panel connections; and an opaque first layer disposed at least partially on the second conductive material. Additionally or alternatively to one or more examples disclosed above, in other examples the touch sensor panel, further comprises: a passivation layer disposed on the first substrate. Additionally or alternatively to one or more examples disclosed above, in other examples the passivation layer is distinct from the first layer. Additionally or alternatively to one or more examples disclosed above, in other examples the touch sensor panel, further comprises: a plurality of second lines of a third conductive material. Additionally or alternatively to one or more examples disclosed above, in other examples the first conductive material is the same as at least one of the second conductive material and the third conductive material. Additionally or alternatively to one or more examples disclosed above, in other examples the plurality of first lines are supported on the first substrate and the plurality of second lines are supported on a second substrate, wherein the second substrate is different from the first substrate. Additionally or alternatively to one or more examples disclosed above, in other examples the first layer is a black mask. Additionally or alternatively to one or more examples disclosed above, in other examples the touch sensor panel, further comprises: one or more alignment marks disposed on the first substrate. Additionally or alternatively to one or more examples disclosed above, in other examples the one or more alignment marks are aligned with one or more edges of the first layer. Additionally or alternatively to one or more examples disclosed above, in other examples the touch sensor panel, further comprises: a cover material; and an adhesive layer, wherein the adhesive layer is disposed between the cover material and the first layer.

In some examples, a method for forming a touch sensor panel is disclosed. The method may comprise: forming a plurality of first lines of a first conductive material on a first substrate; forming a second conductive material electrically connected to the plurality of first lines to one or more traces for off-panel connections; and forming an opaque first layer at least partially on the second conductive material. Additionally or alternatively to one or more examples disclosed above, in other examples the method further comprises: forming a passivation layer on the first substrate. Additionally or alternatively to one or more examples disclosed above, in other examples the passivation layer is distinct from the first layer. Additionally or alternatively to one or more examples disclosed above, in other examples the method further comprises: forming a plurality of second lines of a third conductive material. Additionally or alternatively to one or more examples disclosed above, in other examples the first conductive material is the same as at least one of the second conductive material and the third conductive material. Additionally or alternatively to one or more examples disclosed above, in other examples the plurality of first lines are supported on the first substrate and the plurality of second lines are supported on a second substrate, wherein the second substrate is different from the first substrate. Additionally or alternatively to one or more examples disclosed above, in other examples the first layer is a black mask. Additionally or alternatively to one or more examples disclosed above, in other examples the method further comprises: forming one or more alignment marks on the first substrate. Additionally or alternatively to one or more examples disclosed above, in other examples the one or more alignment marks are aligned with one or more edges of the first layer. Additionally or alternatively to one or more examples disclosed above, in other examples the method further comprises: forming an adhesive layer between a cover material and the first layer.

While various examples have been described above, it should be understood that they have been presented by way of example only, and not by way of limitation. Although examples have been fully described with reference to the accompanying drawings, the various diagrams may depict an example architecture or other configuration for this disclosure, which is done to aid in the understanding of the features and functionality that can be included in the disclosure. The disclosure is not restricted to the illustrated exemplary architectures or configurations, but can be implemented using a variety of alternative architectures and configurations. Additionally, although the disclosure is described above in terms of various examples and implementations, it should be understood that the various features and functionality described in one or more of the examples are not limited in their applicability to the particular example with which they are described. They instead can be applied alone or in some combination, to one or more of the other examples of the disclosure, whether or not such examples are described, and whether or not such features are presented as being part of a described example. Thus, the breadth and scope of the present disclosure should not be limited by any of the above-described examples.

What is claimed is:

1. A touch sensor panel comprising:
   a plurality of first lines of a first conductive material located on a first substrate in a visible area and a border area of the touch sensor panel;
   a second conductive material electrically connected to the plurality of first lines to create one or more traces for off-panel connections and disposed directly on the plurality of first lines in the border area; and
   an opaque layer located at least partially in the border area and directly contacting the first substrate on a first side of the opaque layer and an adhesive on a second side of the opaque layer, opposite the first side; and
   a passivation layer located on the first substrate in the border area and the visible area, the passivation layer being separate and distinct from the opaque layer,
   wherein the opaque layer is a conductive ink.

2. The touch sensor panel of claim 1, further comprising: a plurality of second lines of a third conductive material.

3. The touch sensor panel of claim 2, wherein the first conductive material is the same as at least one of the second conductive material and the third conductive material.

4. The touch sensor panel of claim 2, wherein the plurality of first lines are supported on the first substrate and the plurality of second lines are supported on a second substrate, wherein the second substrate is separate and distinct from the first substrate.

5. The touch sensor panel of claim 1, wherein the opaque layer is a black mask.

6. The touch sensor panel of claim 1, further comprising: a cover material, wherein the adhesive is located between the cover material and the opaque layer.

7. A method for forming a touch sensor panel comprising:
   forming a plurality of first lines of a first conductive material located on a first substrate in a visible area and a border area of the touch sensor panel;
   forming a second conductive material electrically connected to the plurality of first lines to create one or more traces for off-panel connections and disposed directly on the plurality of first lines in the border area; and
   forming an opaque layer located at least partially in the border area, wherein the first substrate directly contacts on a first side of the opaque layer and an adhesive directly contacts a second side, opposite the first side, of the opaque layer; and
   forming a passivation layer located on the first substrate in the border area and the visible area, the passivation layer being separate and distinct from the opaque layer,
   wherein the opaque layer is a conductive ink.

8. The method of claim 7, further comprising:
   forming a plurality of second lines of a third conductive material.

9. The method of claim 8, wherein the first conductive material is the same as at least one of the second conductive material and the third conductive material.

10. The method of claim 8, wherein the plurality of first lines are supported on the first substrate and the plurality of second lines are supported on a second substrate, wherein the second substrate is separate and distinct from the first substrate.

11. The method of claim 7, wherein the opaque layer is a black mask.

12. The method of claim 7, the adhesive is located between a cover material and the opaque layer.

13. The touch sensor panel of claim 1, wherein the plurality of first lines and the passivation layer are located on a first side of the first substrate, and further wherein the passivation layer surround the plurality of first lines and the second conductive material.

14. The touch sensor panel of claim 1, wherein the opaque layer is located exclusively in the border area of the touch sensor panel.

15. The method of claim 7, wherein the plurality of first lines and the passivation layer are formed on a first side of the first substrate in the border area and the visible area of the touch sensor panel, and wherein the passivation layer surrounds the plurality of first lines and the second conductive material.

16. A touch sensor panel comprising:
   a plurality of first lines of a first conductive material located on a first substrate in a visible area and a border area of the touch sensor panel;
   a second conductive material electrically connected to the plurality of first lines to create one or more traces for off-panel connections and disposed directly on the plurality of first lines in the border area; and
   a conductive opaque layer at least partially in the border area and contacting the first substrate on a first side of the opaque layer and an adhesive on a second side of the opaque layer, opposite the first side; and
   a passivation layer located on the first substrate in the border area and the visible area, the passivation layer being separate and distinct from the opaque layer,
   wherein the conductive opaque layer is a conductive ink.

* * * * *

UNITED STATES PATENT AND TRADEMARK OFFICE
CERTIFICATE OF CORRECTION

| | | |
|---|---|---|
| PATENT NO. | : 9,971,459 B2 | Page 1 of 1 |
| APPLICATION NO. | : 14/169287 | |
| DATED | : May 15, 2018 | |
| INVENTOR(S) | : Lynn R. Youngs | |

It is certified that error appears in the above-identified patent and that said Letters Patent is hereby corrected as shown below:

At Column 11, Claim number 7, Line number 40, please delete the word "located".
At Column 11, Claim number 7, Line number 40, please delete the word "visible" and replace it with the word --border--.
At Column 11, Claim number 7, Line number 41, please delete the word "border" and replace it with the word --visible--.
At Column 11, Claim number 7, Line number 45, please delete the word "and".
At Column 11, Claim number 7, Line number 46, please delete the word "located".
At Column 11, Claim number 7, Line number 48, please delete the word "on".
At Column 11, Claim number 7, Line number 48, please add a --,-- between the words 'layer' and 'and'.
At Column 12, Claim number 7, Line number 1, please delete the word "located".
At Column 12, Claim number 16, Line number 40, please delete the word "and".

Signed and Sealed this
Twenty-eighth Day of August, 2018

Andrei Iancu
*Director of the United States Patent and Trademark Office*